Patented Jan. 3, 1933

1,892,871

UNITED STATES PATENT OFFICE

JOYCE H. CROWELL, OF BUFFALO, NEW YORK, ASSIGNOR TO NATIONAL ANILINE & CHEMICAL COMPANY, INC., OF NEW YORK, N. Y., A CORPORATION OF NEW YORK

COLOR BASE AND COMPOSITION CONTAINING THE SAME

No Drawing.   Application filed June 21, 1928.   Serial No. 287,358.

This invention relates to oil-soluble color bases and to compositions containing them. It relates more specifically to oil-soluble color bases which are obtainable by the condensation of hydroxyanthraquinone compounds or mixture of hydroxyanthraquinone compounds with an aromatic primary amine or mixtures of aromatic primary amines in the presence of boric acid, and to colored compositions of matter containing said color bases, such as varnishes, lacquers, oil stains, artificial and patent leathers, cellulose plastics and compositions, "Bakelite", inks, and the like coating and plastic compositions.

In the production of colored varnishes, wood stains, lacquers (including those containing cellulose derivatives, such as the esters, ethers, etc.), artificial leather, films, patent leather, printing inks, and related products and compositions, it has heretofore been proposed to incorporate in the composition an oil-insoluble-color-base salt of stearic, oleic, or similar fatty acid, which salts are soluble in the composition to be colored. These fatty acid salts have the objection, however, of retarding drying, of having relatively low melting points, and of smearing when crushed; so that they cannot be ground, or be readily mixed with other oil soluble coloring materials for shading purposes.

I have found that color bases which are arylamino derivatives of an anthraquinone compound or of anthraquinone compounds, or mixtures of the same, are soluble in oily bodies and can be used in the preparation of various colored coating and plastic compositions instead of the above mentioned stearic or other fatty acid salts. Those compounds which can be obtained by condensing a polyhydroxyanthraquinone, particularly a mixture of polyhydroxyanthraquinones, and especially those containing two hydroxyl groups in para-position to each other, with a primary aromatic amine or a mixture of primary aromatic amines by heating in the presence of a suitable condensing agent, such as boric acid, preferably with removal during the condensation of the water present or formed in the reaction, are particularly useful in the preparation of such colored compositions.

The color bases of this invention are dark, friable powders; have relatively high melting points; can be readily crushed and powdered; and can be mixed in the dry form with other solid oil-soluble colors for shading purposes. They are insoluble in water; slightly soluble in alcohol; but are soluble in organic oily bodies, such as coal tar oils (e. g. benzene, toluene, solvent naphtha, etc.), petroleum hydrocarbon oils (e. g. benzine, gasoline, kerosene, etc.—although to a less extent), organic basic oils (e. g. aniline, toluidine, xylidine, pyridine, etc.), organic acid esters (e. g. amyl acetate, butyl acetate, etc.), ketones (e. g. acetone), vegetable oils (e. g. china wood oil, cottonseed oil, linseed oils, turpentine, etc.), waxes, halogenated hydrocarbon oils (e. g. dichlorbenzene, tetrachlorethane, etc.). In general, they have high tinctorial power, for example, one part of a color base such as is described below in Example 2 dissolved in 50,000 to 100,000 parts of gasoline gives a violet solution.

In preparing the color bases of the invention according to one method of procedure, a suitable anthraquinone compound, for example, a polyhydroxyanthraquinone compound, such as quinizarine, chlorquinizarine, purpurin, or mixtures of them, is condensed with a primary aromatic amine, such as a primary aromatic amine of the benzene series, for example, aniline, xylidine, toluidine, or mixtures of them, by heating the anthraquinone compound with an excess of the amine in the presence of a suitable condensing agent, e. g. boric acid, preferably while passing a current of air or other relatively inert gas over the surface of the reaction mixture, to remove or eliminate the water, or a controlled portion thereof, present or formed during the condensation reaction. Upon completion of the condensation, the excess amine is removed by adding soda ash and steam distilling, or by treating with dilute sulfuric or other suitable acid under suitable conditions, and the water insoluble color base (which comprises a mixture of arylidoanthraquinone compounds) is recovered.

Color bases are obtained which give various shades upon solution in an oily solvent, such as solvent naphtha, dilute solutions of the bases being from red to violet to blue to green in color. The shade and depth of color which the base imparts to its solution in an oily body depend upon its concentration in the solution, and upon its mode of preparation. In preparing the color bases by the above process, the extent of condensation, temperature of reaction, relative proportions of anthraquinone compound and aromatic amine used, as well as the nature of the individual compounds treated all influence the color and solubility of the color base.

A wood stain, varnish, lacquer, or other colored coating or plastic composition can be prepared by forming a solution of the color base in a suitable ingredient of the composition, e. g. in raw or boiled linseed oil, acetone, benzol, toluol, amyl acetate, etc., and employing the resulting solution as such, for example, as an oil stain for wood, or then incorporating the solution into the composition, e. g. into a varnish, lacquer, printing ink, etc.; or the uncolored composition can be made up and the color base added to it and incorporated therein. Moreover, the color base can be mixed with other oil soluble colors, and the mixture incorporated in the composition to give a composition of the desired hue. Thus, for example, jet black compositions can be produced by mixing a blue black color base with a yellow, orange or red oil soluble dyestuff, such as amino-azo-toluene, xylidine-azo-β-naphthol, and the like, (e. g. by grinding them together), and incorporating the mixture in a coating or plastic composition; the mixture being either in the form of a dry powder or of a solution in a solvent, such as benzol or an oily ingredient of the composition. By dissolving the color base and other dyestuff separately in a suitable solvent or solvents and incorporating the solutions in the composition, the same result may be secured.

The color bases also can be employed for coloring such oils as gasoline, benzine, and the like, and as toners in compositions containing pigments, such as carbon paper, typewriter ribbons, certain printing inks, etc. Furthermore, if desired, they may be used in conjunction with the fatty acids, such as stearic, oleic, etc., in the same manner as the bases heretofore used.

The invention will be further explained in connection with the following specific examples which are given merely for illustrative purposes. The parts are by weight.

Preparation of color base

*Example 1.*—150 parts of quinizarine, 150 parts of mixed xylidines and 40 parts of meta-boric acid ($HBO_2$) are heated with agitation to about 155°–170° C. for about one-half hour. A dark greenish-blue solution is obtained, which is cooled to about 45°–60° C., 60 parts of soda ash and about 500 parts of water are added, and the mixture is steam distilled to remove the excess of xylidines. The residue is filtered, washed with water and dried. A dark crystalline material is obtained, which dissolves in cold benzol to give a greenish blue solution.

*Example 2.*—100 parts of dry crude chlorquinizarine (containing chlorquinizarine and quinizarine), 400 parts of aniline and 12.5 parts of crystallized boric acid ($H_3BO_3$) are heated while stirring in a closed vessel provided with a vent and with agitating, heating and cooling means, at a temperature of about 100°–120° C. for about a half-hour, a current of air being drawn over the surface of the mixture to remove the water vapor formed or present. A portion of the aniline also is removed with the water vapor and is recovered by condensing and collecting in a suitable receiver. The temperature is then raised and maintained at about 140°–145° C., while continuing the passage of air over the surface of the reaction mixture, for about 3 to 5 hours, or until the condensation is completed. The mass is then cooled to about 45°–60° C. and added to 1400–1500 parts of dilute acid, such as hydrochloric or sulfuric acid, and the color base is separated from the residual products, including the excess aniline, by warming (to decompose any organic boric compounds present), filtration, and washing with water, the aniline being removed as a water soluble salt of the acid. The product is then dried. The color base thus obtained, which is a dark blue-black powder comprising a mixture of anilido-anthraquinone derivatives, and containing dianilido-hydroxyanthraquinones, is soluble in toluene to give a greenish-blue to violet solution.

*Example 3.*—100 parts of dry crude quinizarine, 500 parts of aniline, and 50 parts of crystallized boric acid are heated at a temperature of about 175°–180° C. for about a half-hour while passing a current of air over the surface of the mass, as described in Example 2; 200 parts of aniline are then added and the heating continued at about 175°–180° C. for some time. The color base is recovered as above described. It is a blue-black powder, and is more soluble in oily solvents than the product of Example 2, the solutions being of a greener shade of blue in practically all solvents. If in the above example, a mixture of amines, such as can be obtained by nitrating and reducing the benzol fraction of coal tar, be employed instead of aniline, a product still more soluble in oils may be obtained.

*Preparation of a lacquer*

*Example 4.*—A blue-black lacquer is prepared by dissolving 8 ounces of nitrocellulose (lacquer cotton) in a mixture of 1 quart of ethyl acetate and 1 quart of butyl acetate, adding 8 ounces of a mixture of rosin ester and gum dammar dissolved in a mixture of 1 quart of benzol and 1 quart of toluol, adding 4 ounces of diethyl phthalate, and 8 ounces of the product of Example 3 in powder form, and stirring the mixture to render it homogeneous.

*Example 5.*—A lacquer is prepared according to Example 4, with the exception that instead of employing the product of Example 3, a mixture is employed consisting of 10 ounces of the product of Example 1, ½ ounce of amino-azo-toluene, and ¼ ounce of xylidine-azo-β-naphthol. On drying a coating of this lacquer, a beautiful jet-black film is formed.

In the above Examples 4 and 5, the color base, or mixture of color base and shading dyestuff, can be dissolved in the solvent before incorporation into the composition instead of being added to the mixture of the other ingredients in powder form.

*Preparation of a wood stain*

*Example 6.*—4 to 6 ounces of the color base of any of the above Examples 1 to 3 are dissolved in a mixture of 2 quarts of benzol and 2 quarts of solvent naphtha. The stain is applied to wood by dipping or brushing. The color bases can also be mixed with other oil soluble dyestuffs to give an oak, walnut or mahogany stain.

*Preparation of a cellulose plastic*

*Example 7.*—Nitrocellulose is dissolved in just sufficient acetone to produce a semi-plastic viscous mass. A plasticizer, such as camphor, diethyl or dibutyl phthalate or tartrate, is incorporated in amounts varying from 100% to 200% of the weight of the nitrocellulose. A concentrated solution in acetone of the product obtained by condensing a mixture of quinizarine and chlorquinizarine with a mixture of aniline, toluidines and xylidines, according to the method of Example 3, is added to the mixture in amounts sufficient to produce the desired shade, and the mass is thoroughly homogenized. The solvent is then removed by gentle heating, and the mass is moulded under heat and pressure. Instead of dissolving the color base in acetone, other suitable solvents can be used, or the dry, powdered color base can be incorporated directly into the semi-plastic mass.

*Coloring plastics*

*Example 8.*—A solution of the desired depth of color is prepared by dissolving one of the above color bases in a mutual solvent for the color base and for a cellulose plastic (film, sheet, etc.) to be colored, such as acetone, acetone mixed with organic acid esters, organic esters alone or in admixture, etc., and the film or other plastic is rapidly passed through or over the surface of the solution, and then rapidly dried. Delicate shading and tinting may be thus obtained.

It is to be understood that the invention is not limited to the above examples, but that the various ingredients, proportions, conditions and manipulations are capable of wide variation.

In preparing the bases, there may be employed various polyhydroxyanthraquinone compounds, either alone or in admixture, particularly those containing two hydroxyl groups in para-position to each other. Among such compounds may be mentioned quinizarine (1.4-dihydroxyanthraquinone), purpurin (1.2.4-trihydroxyanthraquinone), hydroxyanthrapurpurin (1.2.4.7 - tetrahydroxyanthraquinone), hydroxyflavopurpurin (1.2.4.6-tetrahydroxyanthraquinone), alizarine bordeaux (1.2.5.8.-tetrahydroxyanthraquinone), alizarine pentacyanine (1.2.4.5.8-pentahydroxyanthraquinone), alizarine hexacyanine (1.2.4.5.7.8 - hexahydroxyanthraquinone), 1.2.4.5.6.8-hexahydroxyanthraquinone, and their halogen-, nitro-, alkyl- and amino- derivatives. Moreover, instead of the amines mentioned, there may be used other aromatic amines, such as o- or p- toluidine, cumidine, anisidines, cresidines, alpha- and beta-naphthylamine, diamines (e. g. m- and p- phenylene or toluylene diamine, benzidine, tolidine, etc.), and mixtures thereof. Color bases prepared from mixtures of anthraquinone compounds and mixtures of amines are preferred to those made from the individual compounds, since it has been found that the former are much more soluble than the latter, and therefore of greater utility in the coloring of coating and plastic compositions.

The proportion of anthraquinone compound to amine employed in the reaction may be varied over wide limits, the amine preferably being in excess. The time of heating the reaction mixture may be varied from about one-half to about ten hours; the temperature being from about 125° to 200° C., preferably between 145° to 180° C.

If it is desired to remove the water present or formed during the reaction, or a controlled portion of it, a current of air or other relatively inert gas is passed over the surface of the reaction mixture during the course of the condensation reaction; or it can be removed by means of a vacuum, or by distillation, or by other means. Any amine which may be vaporized and removed with the water can be collected by condensation, separated from the water, and reused. But, it will be understood that, if desired, such water need not be removed, as a condensation will be effected even with it present. Such removal is preferable, however, since it tends to increase the yield of color base, further the extent of the condensation, and produce a product of greater solubility in oils.

Moreover, inasmuch as it has been found that the condensation proceeds to a greater extent if there are employed in the condensation operation, removal of water, the larger quantities of amines, the higher temperatures, and the longer periods of reaction, within the above limits, these conditions are preferred for the production of preferred products. The recovery of the color base from the reaction mixture may be performed in various ways in addition to those disclosed in connection with the above examples, as will be obvious to those skilled in the art.

It will also be understood that the invention is not limited to color bases or mixtures of bases prepared as above described, but that it includes the above color bases or mixtures of color bases prepared by other processes. Thus, the mixed color bases, instead of being prepared by a chemical process, as above, may also be prepared in other ways; as by mixing the respective individual color bases, prepared by any method, in proper proportions.

The amount of color base or bases to be incorporated in the composition will depend on the shade and depth of color desired as well as upon the solubility of the particular color base or bases selected, some of the color bases being more soluble than others, as above pointed out. The order of mixing the ingredients in forming the compositions need not be that above set out in the examples, but any suitable order well known to the art may be used. It is obvious that the compositions prepared may be of widely varying composition, and that the invention herein claimed also comprehends within its scope the incorporation into known compositions of the color bases herein described.

It is, furthermore, evident that the invention is not limited to the production of the specific colored compositions above set out, but that it is applicable to a wide field of compositions; including coating and plastic compositions, such as, colored oil products (e. g. colored gasoline, benzine, etc.); varnishes; oil stains; paint and varnish vehicles; floor polishes; candles; shoe polishes; artificial resinous products (e. g. "bakelite", etc.); printing inks; typewriter inks; cellulose coating and plastic compositions, including artificial and patent leathers; films, electrical insulating materials; dressings for fabrics, leather, paper and the like; spraying and brushing lacquers; artificial threads and textile fibres; artificial hair; etc.

I claim:

1. In a process of producing an arylaminoanthraquinone compound which comprises heating an anthraquinone-hydroxy compound with an aromatic amine and boric acid, the improvement which comprises removing water present from the field of the reaction.

2. In a process of producing an arylaminoanthraquinone compound which comprises heating a mixture containing chlorquinizarine, an aromatic primary amine and boric acid, the improvement which comprises removing water present from the field of the reaction by passing a stream of a relatively inert gas in contact with the surface of the reaction mixture.

3. In a process of producing an arylaminoanthraquinone, the improvement which comprises heating a product containing monochlorhydroxyanthraquinone with aniline in the presence of crystallized boric acid, and eliminating water which is formed and present in the reaction mixture.

4. The process of producing an oil-soluble color base which comprises heating a mixture containing a hydroxyanthraquinone, boric acid, and an excess of an aromatic primary amine at a temperature of about 145°–180° C. while removing water from the field of the reaction.

5. The process of producing an oil-soluble color base which comprises heating a mixture containing a plurality of polyhydroxyanthraquinone compounds, one of which is chlorquinizarine, a plurality of aromatic primary amines in excess, and boric acid at a temperature of about 145° to 180° C. while removing water from the field of the reaction.

6. A composition of matter comprising an oil-soluble mixture of arylamino-anthraquinone bases.

7. A composition of matter comprising an oil-soluble mixture of arylamino-anthraquinone bases, such as can be obtained by condensing a mixture of hydroxyanthraquinone compounds with an aromatic primary amine in the presence of boric acid.

8. A composition of matter comprising an oil-soluble arylamino-anthraquinone base, such as can be obtained by condensing a hydroxyanthraquinone compound with an aromatic primary amine in the presence of boric acid while removing water from the field of the reaction.

9. A composition of matter comprising an oil-soluble mixture of arylamino-anthraquinone bases, such as can be obtained by condensing a mixture containing quinizarine and chlorquinizarine with an aromatic primary amine in the presence of boric acid.

10. A composition of matter comprising an oil-soluble mixture of arylamino-anthraquinone bases, such as can be obtained by condensing a mixture containing a plurality of hydroxyanthraquinone compounds, a plurality of aromatic primary amines, and boric acid.

11. A composition of matter comprising an oil-soluble mixture of arylamino-anthraquinone bases, such as can be obtained by condensing a mixture containing a plurality of polyhydroxyanthraquinone compounds, a plurality of aromatic primary amines, and boric acid.

12. A composition of matter comprising an oil-soluble mixture of arylamino-anthraquinone bases, such as can be obtained by condensing a mixture containing a plurality of polyhydroxyanthraquinone compounds, one of which is chlorquinizarine, a plurality of aromatic primary amines in excess, and boric acid.

13. A composition of matter comprising an organic oily solvent containing in solution a mixture of arylamino-anthraquinone bases.

14. A composition of matter comprising an organic oily solvent containing in solution a mixture of arylamino-anthraquinone bases, such as can be obtained by condensing a mixture containing a plurality of polyhydroxyanthraquinones, one of which is chlorquinizarine, a plurality of primary amines of the benzene series in excess, and boric acid.

15. A composition of matter comprising an oil soluble color base obtainable by condensing an aromatic primary amine in the presence of boric acid with a crude 2-chlorquinizarine containing another hydroxyanthraquinone compound, said color base being somewhat soluble in petroleum hydrocarbons and in coal tar hydrocarbons, and capable of being used for the coloring of varnishes and lacquers, and for staining wood.

16. A coating or plastic composition containing as an ingredient an oil-soluble mixture of arylamino-anthraquinone bases.

17. A coating or plastic composition containing as an ingredient an oil-soluble mixture of arylamino-anthraquinone bases, such as can be obtained by condensing a mixture of hydroxyanthraquinone compounds with a primary aromatic amine in the presence of boric acid.

18. A coating or plastic composition containing as an ingredient an oil-soluble arylamino-anthraquinone base, such as can be obtained by condensing a hydroxyanthraquinone compound with an aromatic primary amine in the presence of boric acid while removing water from the field of the reaction.

19. A coating or plastic composition containing as an ingredient an oil-soluble mixture of arylamino-anthraquinone bases, such as can be obtained by condensing a mixture containing quinizarine and chlorquinizarine with a primary aromatic amine in the presence of boric acid.

20. A coating or plastic composition containing as an ingredient an oil-soluble arylamino-anthraquinone base, such as can be obtained by condensing a mixture containing quinizarine and chlorquinizarine with an aromatic primary amine of the benzene series in the presence of boric acid.

21. A coating or plastic composition containing as ingredients an arylamino-anthraquinone base and an organic oily solvent therefor.

22. A coating or plastic composition containing as ingredients a mixture of arylamino-anthraquinone bases, such as can be obtained by condensing a mixture of quinizarine and chlorquinizarine with an aromatic primary amine in the presence of boric acid while removing water from the field of the reaction, and an organic oily solvent therefor.

23. A composition of matter comprising a coating or plastic composition and a solution in a coal tar oil of a mixture of arylamino-anthraquinone bases.

24. A composition of matter comprising a coating or plastic composition and a solution in a coal tar oil of a mixture of arylamino-anthraquinone bases, such as can be obtained by condensing a mixture containing a plurality of polyhydroxyanthraquinones, one of which contains two hydroxyl-groups in para position to each other, an excess of a plurality of primary amines of the benzene series, and boric acid.

25. In a process of producing an arylamino-anthraquinone compound which comprises heating an anthraquinone-hydroxy compound with an aromatic amine and a condensing agent, the improvement which comprises removing water present from the field of the reaction.

26. In a process of producing an arylamino-anthraquinone compound which comprises heating a mixture containing chlorquinizarine, an aromatic primary amine and a condensing agent, the improvement which comprises removing water present from the field of the reaction by passing a stream of a relatively inert gas in contact with the surface of the reaction mixture.

27. A coating or plastic composition containing as ingredients an arylamino anthraquinone base, an organic oily solvent therefor, and a material soluble in said solvent selected from the group consisting of cellulose derivatives and resinous bodies.

28. A coating or plastic composition containing as ingredients a mixture of arylamino anthraquinone bases, an organic oily solvent therefor, and a cellulose derivative soluble in said solvent.

29. A coating or plastic composition containing as ingredients a mixture of arylamino-anthraquinone bases, such as can be obtained by condensing a mixture of quinizarine and chlorquinizarine with an aromatic primary amine in the presence of boric acid while removing water from the field of the reaction, an organic oily solvent therefor, and nitrocellulose.

In testimony whereof I affix my signature.

JOYCE H. CROWELL.